(12) United States Patent
Feuerstein et al.

(10) Patent No.: US 11,475,629 B2
(45) Date of Patent: Oct. 18, 2022

(54) METHOD FOR 3D RECONSTRUCTION OF AN OBJECT

(71) Applicant: GritWorld GmbH, Frankfurt am Main (DE)

(72) Inventors: Florian Feuerstein, Frankfurt am Main (DE); Xiaomao Wu, Frankfurt am Main (DE)

(73) Assignee: GritWorld GmbH, Frankfurt am Main (DE)

( * ) Notice: Subject to any disclaimer, the term of this patent is extended or adjusted under 35 U.S.C. 154(b) by 0 days.

(21) Appl. No.: 17/419,979

(22) PCT Filed: Dec. 30, 2019

(86) PCT No.: PCT/EP2019/087166
§ 371 (c)(1),
(2) Date: Jun. 30, 2021

(87) PCT Pub. No.: WO2020/141161
PCT Pub. Date: Jul. 9, 2020

(65) Prior Publication Data
US 2022/0068018 A1  Mar. 3, 2022

(30) Foreign Application Priority Data
Jan. 2, 2019  (DE) .................. 10 2019 100 011.4

(51) Int. Cl.
*G06T 17/00* (2006.01)
*G06T 7/536* (2017.01)
*G06T 7/00* (2017.01)

(52) U.S. Cl.
CPC .............. *G06T 17/00* (2013.01); *G06T 7/536* (2017.01); *G06T 7/97* (2017.01); *G06T 2210/56* (2013.01)

(58) Field of Classification Search
None
See application file for complete search history.

(56) References Cited

U.S. PATENT DOCUMENTS

| | | | |
|---|---|---|---|
| 8,699,787 B2 | 4/2014 | van den Hengel et al. | |
| 2010/0106998 A1* | 4/2010 | Xiao | ............. G06N 20/00 714/1 |

(Continued)

FOREIGN PATENT DOCUMENTS

| | | |
|---|---|---|
| DE | 102015010264 A1 | 2/2017 |
| WO | WO-2009003225 A1 | 1/2009 |

OTHER PUBLICATIONS

Chris Russell et al.: "Dense Non-rigid Structure from Motion", 3D Imaging, Modeling, Processing, Visualization and Transmission (3DIMPVT), 2012 Second International Conference on, IEEE, Oct. 13, 2012 (Oct. 13, 2012), pp. 509-516, XP032277315, DOI: 10.1109/3DIMPVT.2012.70 ISBN: 978-1-4673-4470-8 abstract p. 513-p. 514.

(Continued)

*Primary Examiner* — Frank S Chen

(57) ABSTRACT

The invention relates to a method for 3D reconstruction of an object comprising the following steps: generating a plurality of images of an object by at least one camera; extracting features of the object from the plurality of images; generating a cloud of three dimensional points arranged in a three dimensional model representing the object; identifying the images each of which comprises at least one of a subset of said features; determining a first set of three dimensional points corresponding to the subset of said features and a second set of three dimensional points; determining a mathematical equation which corresponds to a predefined three dimensional geometric structure as a building block of the object by means of the first set and the second set of the three dimensional points; and rendering a three dimensional (Continued)

model of the object by means of at least the predefined three dimensional geometric structure.

10 Claims, 1 Drawing Sheet

(56) References Cited

U.S. PATENT DOCUMENTS

2011/0267430 A1* 11/2011 Sakano .................. G06T 7/73
                                                              348/46
2019/0012804 A1*  1/2019 Wang ................. G06T 3/4038
2019/0122378 A1*  4/2019 Aswin ................. G06T 5/003

OTHER PUBLICATIONS

Kiyoung Kim et al: "Keyframe-based modeling and tracking of multiple 3D objects", Mixed and Augmented Reality (ISMAR), 2010 9th IEEE International Symposium on, Oct. 1, 2010 (Oct. 1, 2010), pp. 193-198, XP55491854, Piscataway, NJ, USA DOi: 10.1109/ISMAR.2010.5643569 ISBN: 978-1-4244-9343-2, p. 3; figure 1.

International Search Report issued in PCT/EP2019/087166, dated Feb. 13, 2020.

* cited by examiner

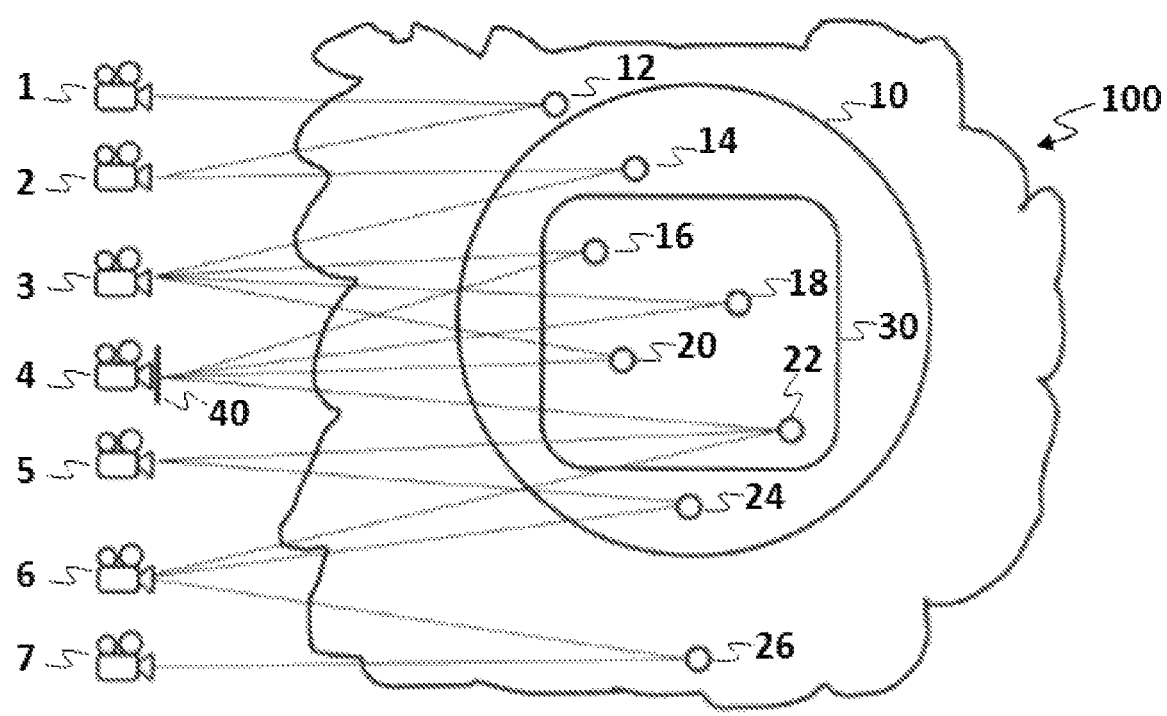

METHOD FOR 3D RECONSTRUCTION OF AN OBJECT

CROSS-REFERENCE TO RELATED APPLICATIONS

This application is a 371 U.S. National Phase of International Application No. PCT/EP2019/087166 filed on Dec. 30, 2019, which claims priority to German Application No. 10 2019 100 011.4 filed on Jan. 2, 2019. The entire disclosures of the above applications are incorporated herein by reference.

The present disclosure relates to a method for 3D reconstruction of an object, a data processing system comprising means for carrying out the method, a computer program comprising instructions which cause the computer to carry out the method and a computer-readable medium comprising instructions which cause the computer to carry out the method.

In computer vision and computer graphics, 3D reconstructions realize reproductions of the shape and appearance of real objects. In order to achieve this purpose, digital three-dimensional models of the real objects are created by a variety of techniques. As one of these techniques, the modern photogrammetric technique is widely used which takes measurements from photographs in order to recover the exact positions of surface points of the real objects.

A typical photogrammetry method for reconstruction of a real object may comprise the following steps:

Firstly, a plurality of photos of the object to be reconstructed is taken by a camera or cameras, simultaneously or at different shooting times, from different camera poses which are a combination of the position and the orientation of the camera.

Afterwards, feature points of each photo are detected and extracted from the photos in a manner known per se, such as by using the feature detector Scale-Invariant Feature Transform (SIFT) or Speeded-Up Robust Features (SURF).

A feature on a taken photo is an "interesting" part thereof, such as corner points (edges with gradients in multiple directions), blobs or ridges of this photo.

Subsequently, the features detected from all the photos are matched to detect geometric relations between the photos in a manner known per se, e.g. by the Lukas-Kanade tracker.

Thereafter, a widely implemented algorithm named Structure from Motion (SfM) is used to extract features among the photos and to compute the orientations of the cameras as well as the positions of the feature points of the object to be reconstructed. There is nowadays a variety of SfM software available on the market. The Output of commercially available SfM software may be a cloud of three-dimensional points corresponding to the detected two-dimensional features on the taken photos.

By means of the cloud of the three-dimensional points, the surface of an object model can be reconstructed. The quality of the object model depends, among others, on the local density of the cloud of the three dimensional points which is defined as the ratio of the amount of three-dimensional points located in a region to the area of the best fit surface or volume corresponding to the three-dimensional points. The higher the local density of the cloud of three-dimensional points is, the better the quality of the object model is.

In the last step, the object model is textured to acquire a realistic appearance.

During the step of reconstruction of an object model with the cloud of the three-dimensional points, geometric structures such as planes, curved surfaces or polyhedrons as building blocks of the object model may be firstly reconstructed.

The speed of the reconstruction of the geometric structures is, however, quite low so far due to the high computational cost, and the quality of the reconstruction result may also be unsatisfying because of e.g. a low local density of the cloud of the three dimensional points in the region where the geometric structure is to be reconstructed.

Thus, it is an object of the present disclosure to provide a rapid as well as more precise 3D reconstruction of a target object.

This object is solved by the appended independent claims. The dependent claims refer to preferred embodiments.

The present disclosure relates to a method for 3D reconstruction of an object comprising the following steps:

A) generating a plurality of images of an object by at least one camera, in particular from different camera angles and positions;

B) extracting features of the object from the plurality of images;

C) generating a cloud of three-dimensional points arranged in a three-dimensional model representing the object, wherein each of the three-dimensional points correspond to one of said features which is extractable from at least two of the plurality of images;

D) selecting an area in one of the plurality of images which contains a projection of at least a part of a predefined three-dimensional geometric structure as a building block of the object,
   wherein the predefined three-dimensional geometric structure is representable by a mathematical equation which comprises a plurality of unknown coefficients, and
   wherein a subset of said features of the object, each corresponding to one of said three dimensional points, are contained in the area and the number of the features in the subset of the features is not less, i.e is equal to or is greater, than the number of the unknown coefficients of the mathematical equation;

E) identifying the images each of which comprises at least one of the features in the subset of said features;

F) determining a first set of three dimensional points corresponding to the subset of said features mentioned in step D and a second set of three dimensional points comprising at least one three dimensional point corresponding to at least one feature which does not belong to the subset of said features, but is extractable from at least two of the identified images in step E;

G) determining said mathematical equation which corresponds to the predefined three-dimensional geometric structure by means of the first set and the second set of the three-dimensional points; and H) rendering a three-dimensional model of the object by means of at least the predefined three-dimensional geometric structure.

Various embodiments may preferably implement the following features.

It is particularly favourable that by means of the steps D to G mentioned above the time for reconstructing the required geometric structures as building blocks for the object to be reconstructed is remarkably reduced. In addition, the overall reconstruction quality is considerably improved notwithstanding a relatively low local density of the cloud of three-dimensional points.

After the generation of a cloud of three-dimensional points representing the object to be reconstructed mentioned in step C, any of the taken images may be chosen for selecting an area in the chosen image as long as both of the following preconditions are satisfied:

Firstly, in this area of the chosen image, a projection of at least a part of a predefined three-dimensional geometric structure, which is representable by a mathematical equation with e.g. M unknown coefficients, as the building blocks for the object to be reconstructed is provided.

Secondly, detected feature points are available in this area, wherein if the number of said feature points is denoted with N, N should be not less than M.

This selection of an area from a taken image may be conducted by the user who operates the software for reconstructing the real object. Alternatively, the selection operation may be carried out by a computer program in which both preconditions mentioned above have been predefined and stored in a manner known per se.

After the selecting process, other relevant images are identified in step E. The relevant images are a subset of the taken images and defined as images each of which comprises at least one of the N features points extractable from said selected area of the image chosen in step D.

Since each of the three dimensional points in the cloud of three dimensional points generated in step C corresponds to a two dimensional feature (point) which can be extracted from at least two of the taken images, a first set consisting of N three dimensional points is inventively determined according to the N feature points mentioned in step D.

A second set consisting of e.g. X three dimensional points is determined. These X three dimensional points correspond to X feature points which do not belong to said N feature points, but are other feature points each of which can be extracted from at least two of said relevant images, i.e. said subset of the taken images.

Next, the mathematical equation which corresponds to the predefined three-dimensional geometric structure can be determined using the first and second set of three-dimensional points.

Since the mathematical equation has M unknown coefficients and the number N of the three dimensional points in the first set is already equal to or more than the number of the unknown coefficients M, the mathematical equation can be determined or recognized, i.e., the unknown M coefficients can be figured out, by only the N three dimensional points in the first set.

The second set with X three dimensional points is then used to evaluate the mathematical equation determined by the first set with N three dimensional points. For instance, the relative coordinates of the X three dimensional points in the second set are put into the determined mathematical equation, respectively, in order to test whether the equation is still established.

Since the subset of images identified in step E is relevant to the chosen image in step D because these images share at least one feature point in the selected area which contains a projection of at least a part of the predefined three dimensional geometric structure, there is a high possibility that the X features in the subset of images mentioned in step F corresponds to at least one three dimensional point on the surface of the predefined three dimensional geometric structure.

In other words, the second set with X three-dimensional points may contain at least one three-dimensional point on the surface of the predefined three-dimensional geometric structure.

During the equation establishment test mentioned above, the more three dimensional points in the second set can fit or can approximately fit the equation, the more likely the mathematical equation is correctly determined or is the best suit formula for representing the predefined three dimensional geometric structure.

Conversely, the less three-dimensional points in the second set fit or approximately fit the equation, the less likely the mathematical equation is correctly determined or is the best suit formula for representing the predefined three-dimensional geometric structure.

If the result of said equation establishment test is not satisfying because e.g. only one third of the three dimensional points in the second set can fit or approximately fit the equation, the selecting process in step D as well as the subsequent steps E-G can be repeated until the test result satisfies the user or achieves a predefined threshold value in a manner known per se.

Thereby, with the present invention, the predefined three dimensional geometric structure representable by a mathematical equation with M unknown coefficients as a building block of the object, which is a very important basic element of the three dimensional object model to be rendered, can be determined as accurately as possible.

Moreover, it is particularly advantageous that even when the local density of the cloud of the three-dimensional points at the predefined geometric structure is relatively low, with the present invention, the accuracy of the determined predefined geometric structure is still in a high level.

Furthermore, with the help of the inventive selecting step D, the speed of the determination of the predefined three-dimensional geometric structure and thus also the subsequent rendering of the three-dimensional model of the object is considerably improved over the state of the art.

In addition, due to the introduction of the evaluation step using the second set of the three-dimensional point, the determination of the predefined three-dimensional geometric structure is not overly sensitive to the selecton of the area in step D.

In a preferable embodiment, the geometric structures are a plane, a sphere, a cylinder, a cone, a donut-shaped structure or a similar three-dimensional regular body.

Taken a plane as an example, a plane can be described by a mathematical equation $ax+by+cz=d$ with three variables x, y, z and four unknown coefficients a, b, c, d. As long as in the selected area of the chosen image the number of the features in said subset of the features equal to or more than three, the four unknown coefficients a, b, c, d can be figured out by calculations by means of the three dimensional points in the first set corresponding to the subset of the features. The number of three-dimensional points must be sufficient to calculate all unknown coefficients of the mathematical equation.

Afterwards, the second set of three-dimensional points, the determination of which has already been explained in detail above, is used to evaluate whether the determined mathematical equation with three determined coefficients is the best fit to the predefined plane or not.

Another example is described as follows: a sphere can be described by a mathematical equation $(x-a)^2+(y-b)^2+(z-c)^2=r^2$ with three variables x, y, z and four unknown coefficients a, b, c, r. As long as in the selected area of the chosen image the number of the features of said subset of the features equal to or more than four, the four unknown coefficients a, b, c, r can be figured out by calculations by means of the three dimensional points in the first set corresponding to the subset of the features.

Afterwards, the second set of three-dimensional points, the determination of which has already been explained in detail above, is used to evaluate whether the determined mathematical equation with four determined coefficients is the best fit to the predefined sphere or not.

In another preferable embodiment, the method for 3D reconstruction of an object comprises further steps as follows:

I) identifying vanishing points of the plurality of images, respectively;

J) confining the predefined three-dimensional geometric structure by means of at least one of the vanishing points.

It is to be noted that the steps I and J are not performed after step H, but before it. Preferably, the steps I and J are performed between the steps B and H. More preferably, step J is performed between the steps F and H.

In step I, vanishing points of the plurality of images are identified and extracted in a manner known per se, such as by means of a Gaussian sphere. A vanishing point is a point on the image plane of a perspective drawing where the two-dimensional perspective projections (or drawings) of mutually parallel lines in three-dimensional space appear to converge.

Since a vanishing point constrains the normal direction of, if any, a plane surface of the three-dimensional geometric structure, these vanishing points can be used to confining or determining the predefined three-dimensional geometric structure. Thereby, the predefined three-dimensional geometric structure can be determined more precisely.

In another preferable embodiment, the vanishing points are identified by analyzing converging lines in the plurality of images. An image may be described by or have a horizontal image axis and a vertical image axis. Accordingly, converging lines near to the horizontal image axis are used to identify at least a vanishing point for horizontal scene lines, and converging lines near to the vertical image axis are used to identify at least a vanishing point for vertical scene lines.

In another preferable embodiment, the three-dimensional geometric structure is textured by means of at least part of an image among said plurality of images, wherein said part of the image is identified and selected by means of the three-dimensional points in the cloud of three-dimensional points. Thereby, a rapid and relatively precise texturing of the three-dimensional geometric structure is accomplished.

In another preferable embodiment, the rendered three-dimensional model is evaluated by projecting the plurality of images onto the model and computing the matching degree between the images and the model. If the matching degree is not satisfying for the user, the selecting process in step D and/or the texturing process mentioned above may be carried out once again.

In another preferable embodiment, the computed matching degree is used to optimize at least one of the determined unknown coefficients by finding a local maximum matching degree while changing the value of the determined coefficient.

The matching degree between the texture of the model and the plurality of images can be described by photometric error. The photometric error may be used to optimize at least one coefficient of the mathematical equation. This is possible by finding a local minimum of the photometric error while iteratively changing the value of the coefficient. Any known non-linear optimization algorithm can be used for this purpose, e.g. Levenberg-Marquardt-Algorithm.

Compared to the known point fitting algorithms such as RANSAC, with this embodiment of the present method, the rendered three dimensional model is more accurate since this embodiment uses the information of millions of pixels from the plurality of images, and it can thus reach an accuracy in subpixel level.

In another preferable embodiment, the features of the object extracted from the plurality of images are used to compute said matching degree by determining whether said features are also extractable from the rendered three-dimensional model. A high matching degree is achieved, if more than 50%, in particular more than 70%, of the features extracted from the plurality of images are also extractable from the rendered three-dimensional model. It is favourable that thereby a full automation regarding the evaluation of the rendering quality of the three-dimensional model is realized.

It shall be understood that the terms "photo", "image", "pictures" or any other variations thereof are interchangeable in the present patent application.

Further advantageous details and features may be taken from the following description of an exemplary embodiment of the invention in conjunction with the drawing, in which:

FIG. 1 shows a schematic illustration of an embodiment of the inventive method for 3D reconstruction of an object.

According to FIG. 1, seven camera icons 1 to 7 at the left side represent seven images 1 to 7 of an object 100 to be three-dimensionally reconstructed, the images being taken from one camera from different camera angles.

It is to be noted that these images 1 to 7 may also be taken from several cameras from different camera poses, either simultaneously or at different shooting times. Although only seven images are shown in FIG. 1 due to the reason that fewer images are suitable for an easy explanation, it is not excluded that more images can be taken and used for implementing the inventive method.

Afterwards, "interesting" parts on the images 1 to 7 such as corner points and ridges of the object 100, i.e. feature points of the object 100, are extracted from the images 17. These two-dimensional feature points or features of the object 100 are not shown in FIG. 1.

Thereafter, a cloud of three-dimensional points arranged in a three-dimensional model representing the object 100 is generated, each of the three-dimensional points corresponding to one of the features which is extractable from at least two of the images 1 to 7. These three-dimensional points are denoted in FIG. 1 by numbers 12, 14, 16, 18, 20, 22, 24, 26.

Subsequently, an area 40 is selected in image 4. This area contains a projection of a part 30 of a predefined sphere 10 as a building block of the object 100. For a convenient explanation, in FIG. 1 the predefined sphere 10 and the three-dimensional points 12-26 are enlarged on purpose, while the object 100 to be reconstructed is not shown with a concrete form/boundary.

The predefined sphere 10 is representable by a mathematical equation $(x-a)^2+(y-b)^2+(z-c)^2=r^2$ with three variables x, y, z and four unknown coefficients a, b, c, r.

A subset of the features of the object 100, each corresponding to one of the three dimensional points 16, 18, 20, 22, is contained in the area 40 and the number of the features in this subset of the features is four which is equal to the number of the unknown coefficients a, b, c, r of the mathematical equation.

The choice of an image from the taken images 1 to 7 and the subsequent selection of an area from the chosen image may be conducted by the user who operates the software for reconstructing the real object. Alternatively, this may also be carried out by a computer program.

Afterwards, the images 3-6 are identified, each of which comprising at least one of the features corresponding to the three-dimensional points 16 to 22.

Then, a first set of three-dimensional points 16 to 22 is determined. A second set of the three-dimensional points consisting of one three-dimensional point 24 is also determined. This three-dimensional point 24 corresponds to one feature which does not belong to the features corresponding to the three-dimensional points 16 to 22, but is extractable from two images 5 and 6 of the identified images 3-6 mentioned above.

Thereafter, the mathematical equation $(x-a)^2+(y-b)^2+(z-c)^2=r^2$ which corresponds to the predefined sphere 10 is determined by means of the first set and the second set of the three dimensional points.

Since the mathematical equation has four unknown coefficients a, b, c, r and the number of the three dimensional points 16 to 22 in the first set is already equal to the number of the unknown coefficients a, b, c, r, the mathematical equation can be determined or recognized, i.e., the unknown coefficients a, b, c, r can be figured out, only by means of the four three dimensional points 16 to 22 in the first set.

Since the identified images 3 to 6 are relevant to the chosen image 4 because these images share at least one feature point in the selected area 40 which is a projection of the part 30 of the predefined sphere 10, there is a high possibility that the extra feature which is extractable from the images 5, 6 and corresponds to the three dimensional point 24 is a feature corresponding to one three dimensional point on the surface of the predefined sphere 10.

In other words, the second set may contain one three-dimensional point on the surface of the predefined sphere 10.

In this regard, the second set with the three-dimensional point 24 is used to evaluate the mathematical equation determined by the first set. The relative coordinates of the three-dimensional point 24 in the second set are put into the determined mathematical equation, respectively, in order to test whether the equation is still established.

If according to the test result the equation is still established or approximately established, the determined mathematical equation can be seen as the best suit formula for representing the predefined sphere 10.

If according to the test result the equation is far from being established, the determined mathematical equation can be seen as not being suitable for representing the predefined sphere 10, and the selecting process mentioned above needs to be repeated once again until the determined mathematical equation survives the evaluation test.

In the last step, a three-dimensional model of the object 100 is rendered by means of at least the best-fit determined predefined sphere 10.

The invention claimed is:

1. A method for 3D reconstruction of an object comprising the following steps:
   A) generating a plurality of images of an object by at least one camera, in particular from different camera angles and positions;
   B) extracting features of the object from the plurality of images;
   C) generating a cloud of three-dimensional points arranged in a three-dimensional model representing the object, wherein each of the three-dimensional points correspond to one of said features which is extractable from at least two of the plurality of images;
   D) selecting an area in one of the plurality of images which contains a projection of at least a part of a predefined three-dimensional geometric structure as a building block of the object, wherein the predefined three-dimensional geometric structure is representable by a mathematical equation which comprises a plurality of unknown coefficients, and
   wherein a subset of said features of the object, each corresponding to one of said three dimensional points, are contained in the area and the number of the features in the subset of the features is not less than the number of the unknown coefficients of the mathematical equation;
   E) identifying the images each of which comprises at least one of the features in the subset of said features;
   F) determining a first set of three-dimensional points corresponding to the subset of said features mentioned in step D and a second set of three-dimensional points comprising at least one three-dimensional point corresponding to at least one feature which does not belong to the subset of said features, but is extractable from at least two of the identified images in step E;
   G) determining said mathematical equation which corresponds to the predefined three-dimensional geometric structure by means of the first set and the second set of the three-dimensional points; and
   H) rendering a three-dimensional model of the object by means of at least the predefined three-dimensional geometric structure.

2. The method according to claim 1, wherein the geometric structures are a plane, a sphere, a cylinder, a cone or a donut-shaped structure.

3. The method according to claim 1, wherein the method further comprises the steps of
   I) identifying vanishing points of the plurality of images, respectively;
   J) confining the predefined three-dimensional geometric structure by means of at least one of the vanishing points.

4. The method according to claim 3, wherein the vanishing points are identified by analyzing converging lines in the plurality of images.

5. The method according to claim 1, wherein the three dimensional geometric structure is textured by means of at least part of an image among said plurality of images, wherein said part of the image is identified and selected by means of the three-dimensional points in the cloud of three dimensional points.

6. The method according to claim 1, wherein the rendered three-dimensional model is evaluated by projecting the plurality of images onto the model and computing the matching degree between the images and the model.

7. The method according to claim 6, wherein the computed matching degree is used to optimize at least one of the determined unknown coefficients by finding a local maximum matching degree while changing the value of the determined coefficient.

8. The method according to claim 6, wherein said features of the object extracted from the plurality of images are used to compute said matching degree by determining whether said features are also extractable from the rendered three-dimensional model.

9. Data processing system comprising means for carrying out the method of claim 1.

10. A non-transitory computer-readable medium having computer-executable instructions that, upon execution of the instructions by a processor of a computer, cause the computer to carry out the method of claim 1.

* * * * *